Feb. 16, 1960 R. W. KEEHN 2,925,372
ELECTROSTATIC FILTER FOR FLUIDS
Filed Sept. 5, 1958
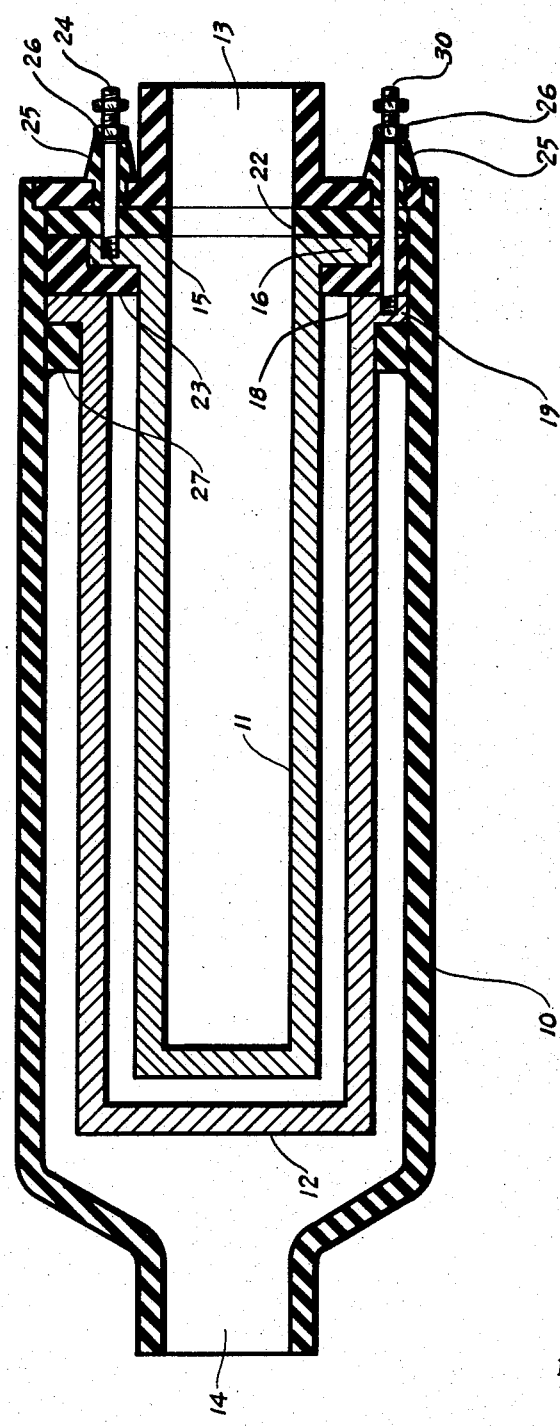
INVENTOR.
RICHARD W. KEEHN.
BY
Walter J. Jason
ATTORNEY.

United States Patent Office 2,925,372
Patented Feb. 16, 1960

2,925,372

ELECTROSTATIC FILTER FOR FLUIDS

Richard W. Keehn, El Cajon, Calif., assignor to General Dynamics Corporation, San Diego, Calif., a corporation of Delaware Application September 5, 1958, Serial No. 759,179

2 Claims. (Cl. 204—302)

The present invention relates to an electrostatic fluid filter, and more particularly relates to an electrical filter which removes undesired and contaminating particles from fluids.

This invention achieves a very high degree of filtering in fluids and is particularly useful in the field of hydraulics. Prior filters used in this field utilize sintered metal elements that filter out contaminating particles by physically obstructing them much like a screen. A sintered filter element is one that has been made by fusing powdered material together so that the end result is a porous or permeable filter element. The tighter, or the more closely knit, a filter element is made then the more efficient its filtering action. Unfortunately, the more closely knit the filter element is made then the greater the fluid pressure drop across the filter. This is often a serious disadvantage and as a consequence a compromise is generally made in filtering efficiency in order to operate without undue loss of pressure. As a result, prior filters are generally not good enough for the high precision hydraulic systems presently being designed for missiles and aircraft.

The present invention is capable of providing a very high degree of filtering without producing any appreciable pressure loss. It is thus generally applicable to fluid systems which require filtering and particularly applicable to very precise hydraulic systems. Generally, the present filter includes at least two filter elements with one filter element carrying a negative electrical charge and the other filter element carrying a positive electrical charge. Particles which pass through the positively charged element will generally give up one or more electrons to the element, leaving the particle with a net positive charge. As the particle attempts to get through the second, and negatively charged, filter element, it is electrostatically attracted thereto and its progress is stopped. Because of this electrical filtering action the invention should be used only with non-conducting or dielectric fluids. In addition to this "electrostatic" filtering, however, one or both elements are constructed to act as screens which physically impede particles in the conventional manner. The filter elements can be much more porous than those used in prior filters so that the total pressure loss caused by the filter is relatively small. At the same time, however, the filtering efficiency of the device is greatly increased because of its combined electrostatic filtering and conventional physical impedance filtering. The present invention is thus free of the disadvantages associated with prior fluid filters.

An object of the present invention is to provide an electrical fluid filter which can remove undesired particles from a fluid.

Another object is to provide a more efficient fluid filter which causes relatively little fluid pressure loss.

Another object is to provide a fluid filter which can remove particles from a fluid by a combination of electrostatic filtering and physical impedance filtering.

Other objects and features of the present invention will be readily apparent to those skilled in the art from the following specification and appended drawing wherein is illustrated a preferred form of the invention.

Referring now to the drawing, a cross section of the filter is shown as consisting primarily of a conduit 10 and two filter elements 11 and 12 positioned therewithin. Conduit 10 is made of a dielectric material, that is, it is an electrical insulator. Filter elements 11 and 12 are sintered bronze elements and are good electrical conductors. The conduit 10 is substantially cylindrical as are the filter elements 11 and 12. An inlet 13 and an outlet 14 are located at opposite ends of the conduit to permit fluid to flow therethrough. Filter elements 11 and 12 are both closed at the outlet end of the conduit and open at the inlet end of the conduit. Both filter elements are shaped much like a cup with element 11 spacially positioned inside element 12. The open end, or mouth 15, of filter element 11 has a flange 16 annularly disposed therearound. The mouth 18 of element 12 has a similarly disposed flange 19. Filter element 11 is held in position within conduit 10 by dielectric washers 22, 23 and terminal rod 24. Terminal rod 24 is securely fixed at one end to element 11 by screw threads or the like. The other end of terminal rod 24 extends beyond the end of conduit 10 and has a screw thread thereon. A dielectric washer 25 is positioned around terminal rod 24 and a nut 26 is engaged with and tightened down on the screw threads of rod 24. This securely fastens filter element 11 in place within conduit 10. Filter element 12 is held in place in like manner by dielectric washers 23, 27, and terminal rod 30. If desired, adhesives may be used to bond the washers, conduit, and filter elements together. Filter element 11 is entirely electrically insulated from conduit 10 by washers 22 and 23. It is possible to completely insulate filter element 12 from conduit 10 by merely decreasing the size of flange 19 and inserting an additional washer between conduit 10 and flange 19. This complete insulation should be used if conduit 10 is formed from a material that is an electrical conductor. Other acceptable alternate materials and configurations may become apparent from a description of the filter's operation.

The inlet 13 and outlet 14 of conduit 10 are inserted in a line carrying a dielectric fluid so that inlet 13 receives the fluid from the line and outlet 14 returns the fluid to the line. The particular shape of inlet 13 and outlet 14 can be changed or modified as required by the line with which they are to mate. After the filter is inserted in the line, an electrical potential difference, or voltage, is applied between terminal rod 24 and terminal rod 30. Since the filter elements are electrical conductors also, the electrical potential difference applied between the terminal rods 24 and 30 is transmitted thereto and sustained therebetween. The voltage applied to the terminal rods is such that element 11 becomes positively charged and element 12 becomes negatively charged. As fluid flows through the inlet it first encounters element 11 which is positively charged. This element is a porous or permeable filter element so that many particles are screened from the fluid simply because they are too large to pass through the filter element. Those particles which are able to pass through element 11 will generally leave the element while carrying a net positive charge. This is due to the fact that element 11 is positively charged and thus attracts electrons away from the particles, leaving them positively charged.

The positively charged particles that leave element 11 are carried on to negatively charged element 12 by the flow of fluid. Element 12 is also a porous element and it may screen out particles also even though such particles passed through element 11. This is not difficult to understand when one considers that the holes in elements 11 and 12 are not of a uniform size and that particles, like a pencil, may strike one element end on and another element sideways. If a positively charged particle striking negatively charged element 12 is not prevented from passing therethrough by physical obstruction then it will generally be prevented from passing therethrough by the electrostatic attraction between the particle and oppositely charged filter element. Thus, there is little probability that a particle entering the filter inlet 13 will pass completely through the filter and outlet 14.

If desired, the electrostatic filtering action can be increased by increasing the voltage applied between the terminal rods 24 and 30. There may be filtering applications, however, where this voltage should be reversed and the first filter element, element 11, negatively charged and the second filter, element 12, positively charged. Such might be the case if it were desired to filter out particles which were already negatively charged by ionic contamination or the like. Regardless of the polarity of the voltage, however, the combination of electrostatic and physical impedance filtering considerably increases the efficiency of the filter.

At the same time, however, the fluid pressure drop across the filter is kept at a relatively low level. This is achieved through the use of filter elements 11 and 12 that are more porous than prior elements. In addition, however, the filter elements have a shape which helps keep pressure loss at a minimum. It should be noted that the substantially cylindrical shape of the filter elements provides a much larger surface area than would a mere disc type element. With the increased surface area more fluid can flow through the filter element per unit of time than was previously possible. There are numerous filter element configurations, such as the cone and hemisphere, which would provide an increased surface area. In addition to alternate configurations, however, the filter elements can also be made of different or alternate materials. The materials used, though, must be electrical conductors in order to permit the filter elements to become electrically charged. The filter elements need not be sintered metal elements but may be very fine mesh, screen, or other permeable and porous type structures that are electrically conductive.

The spacing between the filter elements does not have to be uniform even though it is so illustrated in the drawing. Uniform spacing of the filter elements causes the electrical charge distribution on one filter to be substantially like that on the other filter. Non-uniform spacing would cause the charge distribution on one element to be different from that on the other element but it would not make the filter inoperative. It is conceivable that certain types of non-uniform spacing may be more desirable than uniform spacing.

As illustrated in the drawing the filter contains only two filter elements, but it is possible to use three, four, or more elements in the filter if desired. The minimum number of elements that can be used is two, however, since one element by itself cannot be electrically charged.

Thus, the filter shown in the drawing illustrates only a preferred embodiment of the invention, and it is understood that the invention is not limited thereto as many variations will be readily apparent to those skilled in the art and the invention is to be given its broadest possible interpretation within the terms of the following claims.

What I claim is:

1. A filter comprising a dielectric conduit, said conduit being substantially cylindrical in shape, said conduit having a fluid inlet end portion and a fluid outlet end, said inlet end portion of said conduit being removable, said inlet end portion comprising a dielectric circular plate disposed across the end of said conduit and having a central necked inlet mouth, said necked mouth protruding outwardly, a ring shaped dielectric washer disposed within said conduit adjacent said inlet end portion and about the inlet mouth thereof, a first sintered filter element disposed within said conduit, said first filter element being substantially cylindrical in shape with a closed end, an open end, and an annular flange about said open end, said first filter element positioned with its open end adjacent said ring shaped dielectric washer and inlet mouth, an electrically conductive screw disposed through the circular plate comprising said inlet end portion, through said ring shaped dielectric washer, and screwed into said annular flange to secure said first filter element in place and provide an electrical terminal, an annular dielectric spacing washer positioned about the flange of said first filter element, said spacing washer having an L shaped cross section with one leg thereof positioned between the periphery of said flange and said cylindrical conduit and the other leg positioned to overlap and cover said flange and lie between said conduit and the cylindrical portion of said first filter element, a second sintered filter element disposed within said conduit, said second filter element having substantially the same shape as said first filter element and positioned concentrically about and apart from said first filter element, said second filter element having a closed end spacially adjacent said first filter element and an open end, an annular flange about said open end, the periphery of said flange contacting said cylindrical conduit, said flange positioned adjacent said spacing washer and spaced apart from said first filter element by said spacing washer, an electrically conductive screw disposed through said conduit inlet end portion, through said ring shaped dielectric washer, through said spacing washer, and screwed into the annular flange of said second filter element to secure said second filter element in place and provide an electrical terminal, said filter elements being electrically conductive, and an electrical potential difference applied to and between said electrically conductive screws whereby said first and second filters become oppositely electrically charged.

2. A filter comprising a conduit having a substantially cylindrical shape with a fluid inlet end portion and a fluid outlet end portion, said outlet end portion converging to a necked outlet mouth, said inlet end portion being removable and comprising a circular plate disposed across the end of said conduit, said plate having a central necked inlet mouth which protrudes outwardly from said plate, a ring shaped dielectric washer disposed within said conduit adjacent said plate, said washer having a central opening such that it joins with said inlet mouth of said plate, the periphery of said washer being in contact with said conduit, a first sintered filter element having a substantially cylindrical cup shape with one open end, an annular flange about said open end, said filter element positioned within said conduit with its open end joining with the central opening of said ring shaped washer, an electrically conductive screw disposed through said plate, through said washer, and screwed into said annular flange to secure said first filter element in place and provide an electrical terminal, electrical insulation disposed about said screw as it passes through said plate, an annular dielectric spacing washer positioned between said conduit and said flange and overlapping said flange, said washer having a stepped portion for receiving said flange, a second sintered filter element disposed within said conduit, said second filter element having the same configuration as said first filter element but with a larger cylindrical diameter, said second filter element positioned concentrically over said first filter element and spaced apart therefrom, the annular flange of said second filter element being positioned adjacent said spacing washer and spaced apart from said first filter element thereby, an electrically conductive screw disposed through said plate, through said ring shaped dielectric washer, through said annular dielectric spacing washer, and screwed into the annular flange of said second filter element to secure said second filter element in place, said filter elements being electrically conductive, and an electrical potential difference applied to and between said filter elements.

References Cited in the file of this patent

UNITED STATES PATENTS

| | | |
|---|---|---|
| 987,114 | Cottrell | Mar. 21, 1911 |
| 2,116,509 | Cottrell | May 10, 1938 |
| 2,640,026 | Whittington | May 26, 1953 |

FOREIGN PATENTS

| | | |
|---|---|---|
| 311,141 | Great Britain | May 9, 1929 |
| 582,338 | Great Britain | Nov. 13, 1946 |
| 710,561 | Great Britain | June 16, 1954 |

OTHER REFERENCES

Whittington, 667 O.G., pages 762 and 763, Feb. 17, 1953.